(12) United States Patent
Shih

(10) Patent No.: US 8,567,965 B2
(45) Date of Patent: Oct. 29, 2013

(54) REFLECTIVE OBJECT AND THE PRODUCTION PROCESS THEREOF

(76) Inventor: Hsin-An Shih, Taipei (TW)

( * ) Notice: Subject to any disclaimer, the term of this patent is extended or adjusted under 35 U.S.C. 154(b) by 782 days.

(21) Appl. No.: 12/659,243

(22) Filed: Mar. 2, 2010

(65) Prior Publication Data

US 2011/0128624 A1   Jun. 2, 2011

(30) Foreign Application Priority Data

Nov. 30, 2009   (TW) ................................ 98140784 A

(51) Int. Cl.
*G02B 5/128*   (2006.01)

(52) U.S. Cl.
USPC ........... 359/539; 359/516; 359/532; 359/533; 359/547; 359/548; 359/900

(58) Field of Classification Search
USPC ................ 359/529–542; 156/325–330, 331.8
See application file for complete search history.

(56) References Cited

U.S. PATENT DOCUMENTS

| 2,646,364 A * | 7/1953 | Porth ............................ 156/240 |
| 2007/0188866 A1 * | 8/2007 | Yukawa et al. ............... 359/530 |

* cited by examiner

*Primary Examiner* — James Phan
(74) *Attorney, Agent, or Firm* — Bacon & Thomas, PLLC

(57) ABSTRACT

The present invention is related to a reflective object, which comprises the structure with the following layers sequentially: an adhesive layer embedded with optical components; a color layer; and a reflective layer; wherein the reflective object is characterized that the color layer is not contacted with the optical components. The present invention is also disclosed a method of producing the reflective object.

21 Claims, 3 Drawing Sheets

REFLECTIVE OBJECT AND THE PRODUCTION PROCESS THEREOF

BACKGROUND OF THE INVENTION

1. Field of the Invention

The present invention is related to a reflective object, which is characterized that: the color layer is not contacted with the optical components thereof.

2. Description of the Related Art

Reflective objects and materials thereof have been developed with higher wash resistance and various colors and patterns as time goes by. Reflective objects are commonly used in clothes, waistcoats, hats, shoes or exterior decoration of vehicles to provide traffic safety between pedestrians and vehicles, and are also used in huge advertisement signboards, posters or traffic signs for warnings or safety reminders.

Traditional method for reflective objects production is to obtain an adhesive layer and a color layer at the same time. That is, an adhesive is pre-mixed with inks and coated onto a substrate to form a layer structure. Then, optical components and a reflective layer are formed sequentially. In order to flatten said layer structure of the reflective objects made by said method, it requires great amount of adhesives and inks to fill up the irregular surface of the optical components (usually are in the shape of spheres such as glass beads). The usage of the inks is usually more than 30 g/m$^2$, and reflection effects of the reflective objects are reduced as the optical components and the reflective layer inside are sheltered by such amount of inks resulting in bad light transmittance and reflection.

Another traditional producing method for reflective objects is to obtain an adhesive layer and a color layer separately. First, an adhesive layer embedded with optical components is prepared. The adhesive is used to fix said optical components, and the arrangement of said optical components is in an "exposed" manner; which means, said optical components is partially embedded inside said adhesive. Then, a color layer composed of inks is prepared onto the surface of the optical components, which is not covered by said adhesive. Since the surface of the optical components (usually are in the shape of spheres such as glass beads) which is contacting with the inks is non-flat and with several sphere projections, it required great amount of inks to form a flat and uniform color layer in the producing procedures. However, reflective effects of the reflective objects are reduced as the reflective layer inside are sheltered by such great amount of inks resulting in bad light transmittance and reflection.

The present invention intends to modify the producing procedures; that is, to reduce the amount of the inks of the color layer (i.e. reduce the coverage of the reflective layer) for increasing the reflection effects of the reflective objects by totally embedding the optical components into the adhesive layer and cover the surface of the optical components by adhesives.

SUMMARY OF THE INVENTION

To better appreciate the weaknesses of traditional methods, the main objective of the present invention is to provide a reflective object, which is characterized that: embedding the optical components thereof into the adhesive layer without contacting with the color layer thereof. Since the optical components are totally embedded into the adhesive layer, the surface of said adhesive layer which contacts with the color layer is flat. Therefore, the color layer of the present invention can be a uniform layer which is thinner than that of traditional reflective objects. In such a way, the present invention can have better reflective effects.

Another objective of the present invention is to provide a reflective object, except the aforementioned features, said reflective object further comprises a substrate (which comprises a release layer and a release layer carrier), which is used not only as a base for the optical components to place but also as a releasable protecting structure (release substrate) for protecting the surface of the reflective objects of the present invention before applying to maintain reflective effects thereof.

Another objective of the present invention is to provide a method for production of reflective objects. By embedding optical components into an adhesive layer to obtain a flat surface of said adhesive layer, the usage of inks for formation of a color layer with a flat surface can be reduce. Consequently, the finished objects thereof can have better reflective effects because of less shelter for reflective layer thereof.

Another objective of the present invention is to provide a reflective article, on which the reflective objects of the present invention are attached for applying for various purposes.

In order to achieve the aforementioned objectives, the present invention provides a reflective object, which comprises the following layers sequentially: a adhesive layer embedded with optical components; a color layer; and a reflective layer; wherein the reflective object is characterized that said color layer is not contacted with said optical components.

The present invention also provides a reflective object, which comprises the following layers sequentially: a substrate; an adhesive layer embedded with optical components; a color layer; and a reflective layer; wherein the reflective object is characterized that said color layer is not contacted with said optical components.

Preferably, said reflective object further comprises an attached layer, which is formed on the surface of said reflective layer for attachment of the reflective object onto a surface of an article.

The present invention also provides a method for reflective objects production, which comprises steps of:
 (a) providing a substrate;
 (b) placing a optical components onto the surface of said substrate;
 (c) covering said optical components with a adhesive to obtain a adhesive layer embedded with said optical components;
 (d) providing a color layer onto the surface of said adhesive layer; and
 (e) providing a reflective layer onto the surface of said color layer;
wherein the method is characterized that said color layer is not contacted with said optical components.

The present invention also provides a reflective article which comprises the reflective object of the present invention.

Preferably, the material of said article includes cloth, plastic, wood, metal or rock.

Preferably, said method further comprises providing an attached layer onto the surface of said reflective layer. Preferably, said attached layer is composed of a polymer polymerized by a monomer selected from methyl carbamate, ester, ether, epoxy, urea, carbonic ester, acrylic ester, acrylic acid, olefin, vinyl chloride, amide, alcohol acid or combinations thereof; more preferably, said attached layer is composed of polyurethanes.

Preferably, said substrate comprises a release layer and a release layer carrier, wherein said release layer is provided between said release layer carrier and said adhesive layer. Preferably, said release layer is composed of polyethylene, polypropylene, polybutene, polyvinyl chloride, polyester or mixture thereof. Preferably, said release layer carrier is composed of polyethyleneterephthalate (PET).

Preferably, said adhesive layer is composed of a polymer polymerized by a monomer selected from methyl carbamate, ester, ether, epoxy, urea, carbonic ester, acrylic ester, acrylic acid, olefin, vinyl chloride, amide, alcohol acid or combinations thereof.

Preferably, said optical components are composed of glass, ceramic or synthetic resin.

Preferably, said color layer is composed of polymer, ink or silane coupling agent.

Preferably, said reflective layer is composed of metal or pearl luster material; preferably, said metal is aluminum, silver, tin or combinations thereof.

Preferably, approach for covering said optical components with said adhesive in said step (c) comprises coating, laminating, chemical deposition, imprinting or ink-jetting.

To sum up, by embedding the optical components into the adhesive layer and obtaining a flat surface of said adhesive layer, the method of the present invention can obtain a flat layer structure by using less adhesives and inks. Consequently, light transmittance and reflective effect of the reflective layer inside the layer structure of a finished object are better than that of a traditional reflective object.

DETAILED DESCRIPTION OF THE PREFERRED EMBODIMENTS

Figure 1:
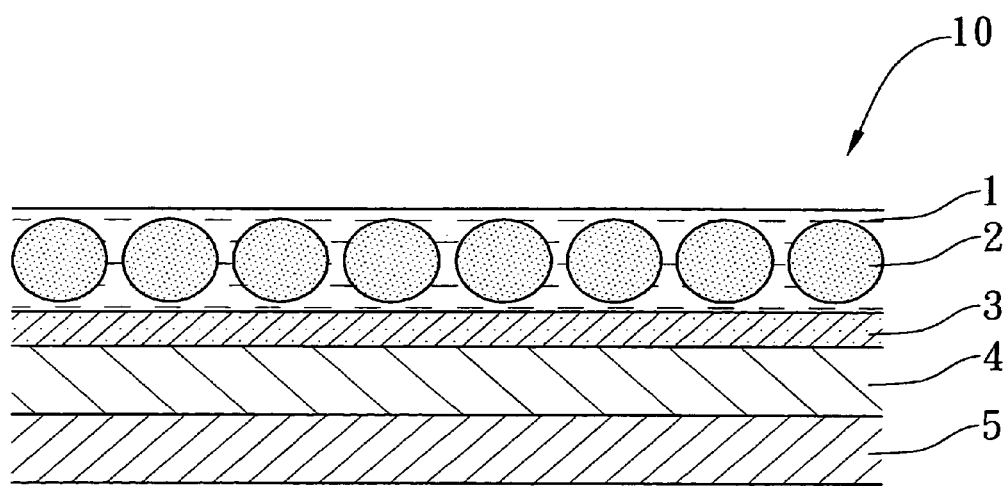
FIG. 1 displays the schematic view showing the layer structure of a reflective object of the present invention.

Please refer to FIG. 1, the reflective object 10 of present invention comprises the following layers sequentially: a adhesive layer 1 embedded with optical components 2; a color layer 3; a reflective layer 4; wherein the reflective object 10 is characterized that said color layer 3 is not contacted with said optical components 2.

Figure 2:
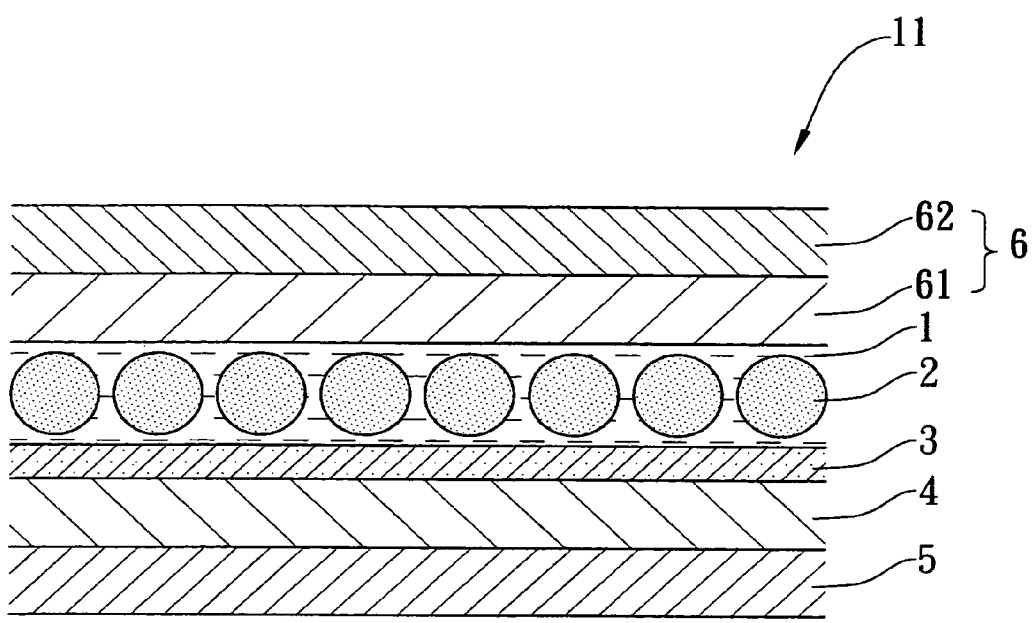
FIG. 2 displays the schematic view showing the layer structure of a substrate-containing reflective object of the present invention.

Please refer to FIG. 2, another reflective object 11 of the present invention comprises the following layers sequentially: a substrate 6; a adhesive layer 1 embedded with optical components 2; a color layer 3; a reflective layer 4; wherein the reflective object 10 is characterized that said color layer 3 is not contacted with said optical components 2. Said substrate 6 comprises a release layer 61 and a release layer carrier 62.

The finished object made by the method for reflective object 11 production of the present invention is showed in FIG. 2, and said method comprises steps of:
  (a) providing a substrate 6;
  (b) placing a optical components 2 onto the surface of said substrate 6;
  (c) covering said optical components 2 with a adhesive to obtain a adhesive layer 1 embedded with said optical components 2;
  (d) providing a color layer 3 onto the surface of said adhesive layer 1; and
  (e) providing a reflective layer 4 onto the surface of said color layer 3;

wherein the method is characterized that said color layer 3 is not contacted with said optical components 2.

The reflective object 10 or 11 of the present invention may further comprises an attached layer 5, and the method of the present invention can further comprises providing an attached layer 5 onto the surface of said reflective layer 4. The attached layer 5 is used to attach said reflective object 10 or 11 onto an article for various applications. Said attached layer 5 is composed of polyurethanes.

Figure 3:
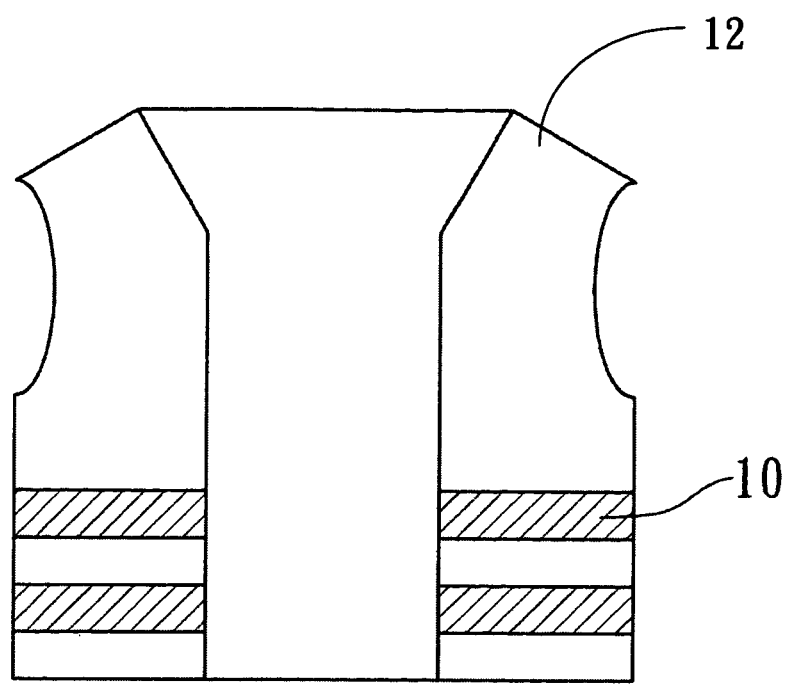
FIG. 3 displays an example of the reflective article of present invention.

An example of a reflective article of the present invention is displayed in FIG. 3, wherein the reflective objective 10 of the present invention is attached onto a waistcoat 12 to provide reflective effects.

The reflective object 10 or 11 can be attached onto a surface of any kind of materials by said attached layers 5; that is, the material of a reflective article 12 of the present invention can be, but not limited to cloth, plastic, wood, metal or rock; preferably, said material is cloth.

With regarding to the reflective object 11 of the present invention, said substrate 6 comprises release layer 61 and release layer carrier 62; wherein said release layer 61 is provided between said release layer carrier 62 and said adhesive layer 1. Said substrate 6 is used as a base for the optical components 2 to place, and then, a flat adhesive layer 1 is formed sequentially to fix the optical components 2. In the reflective object 11 of the present invention, the release layer 62 also provides protections for the adhesive layer 1 and optical components 2 to prevent the finished object from being worn out by other objects and therefore maintains the reflective effects thereof. An example of the material of said release layer carrier 62 is, but not limited to, polyethyleneterephthalate (PET). The release layer 61 of the present invention is used to separate the release layer carrier 62 from the adhesive layer 1. The release layer 61 is composed of, but not limited to polyethylene, polypropylene, polybutene, polyvinyl chloride, polyester or combinations thereof; preferably, said release layer 61 is composed of polyethylene.

The adhesive layer 1 of the present invention is used to fix and support the optical components 2. Said adhesive layer 1 is composed of a polymer polymerized by a monomer selected from methyl carbamate, ester, ether, epoxy, urea, carbonic ester, acrylic ester, acrylic acid, olefin, vinyl chloride, amide, alcohol acid or combinations thereof.

The optical components 2 of the present invention are used to provide reflection. Preferably, said optical components 2, which are sphere with high index of refraction, are composed of, but not limited to glass, ceramic or synthetic resin; preferably, said optical components 2 are composed of glass bead. Preferably, the diameter of said glass bead is 170~400 mesh, and the index of refraction thereof is above 1.925.

The color layer 3 of the present is made by material that is able to absorb light with specific wavelength and is resulting in mono- or multi-colors of said color layer 3. The material of the color layer 3 is, but not limited to polymer, ink or silane coupling agent; preferably, said color layer 3 is composed of ink. Furthermore, the usage of the color layer 3 of the present invention is 5~12 $g/m^2$; preferably, is 10 $g/m^2$.

The reflective layer 4 of the present invention can reflect incident lights of the optical components 2. The reflective layer 4 is composed of metal or pearl luster material; said metal is composed of aluminum, silver, tin or combinations thereof; preferably, said metal is composed of aluminum. In the method of the present invention, approach for covering said optical components with said adhesive in said step (c) comprises coating, laminating, chemical deposition, imprinting or ink-jetting; preferably, said approach is coating. The approach for providing the color layer onto the surface of said adhesive layer is screen printing, ink-jetting, gravure or relief printing; preferably, said approach is ink-jetting.

Example 1

Preparation of Reflective Objects of the Present Invention

A green reflective object is prepared by following steps:
(a) providing a PET layer;
(b) heating a polyethylene (PE) layer and attaching the same onto the surface of said PET layer;
(c) placing a glass bead onto said polyethylene layer, wherein the diameter of said glass bead is 170~400 mesh;
(d) covering said placed glass bead with a adhesive to obtain an adhesive layer with a flat surface;
(e) jetting a green ink onto the surface of said adhesive layer to obtain a color layer, the usage of said ink is about 10 g/m$^2$; and
(f) vacuum coating to obtain an aluminum layer onto said color layer.

The structure of the reflective object prepared in example 1 is displayed in FIG. 2. The following examples were prepared by the same method as example 1 and compared with each other by using the retroreflective performance of silver as a standard for silver, monocolor or multicolor. In each time of the following examinations, the examined area of monocolor reflective object was 9 cm$^2$ (3 cm*3 cm) and the examined area of multicolor reflective object was 100 cm$^2$ (10 cm*10 cm).

Example 2

Examination for Retroreflective Performance of Silver Reflective Object of the Present Invention A silver reflective object was examined for its retroreflective performance in this example. The preparation thereof was according to the green reflective object of example 1 except that the ink used in this example is different. More specifically, no ink was used in the preparation of the silver reflective object.

The examination for retroreflective performance of said silver reflective object was conducted by SGS group (Taiwan), and the result was showed in the following table:

TABLE 1 result of the examination for retroreflective performance of silver reflective object of the present invention.

| Subject | observation angle | light incident angle | Standard Class 2 reflection | Silver reflective object of the present invention |
|---|---|---|---|---|
| retroreflective performance (cd/1x · m$^2$) | 12' | 5° | 330 | 495 |
| | | 20° | 290 | 534 |
| | | 30° | 180 | 531 |
| | | 40° | 65 | 445 |
| | 20' | 5° | 250 | 327 |
| | | 20° | 200 | 361 |
| | | 30° | 170 | 366 |
| | | 40° | 60 | 319 |
| | 1° | 5° | 25 | 32 |
| | | 20° | 15 | 36 |
| | | 30° | 12 | 36 |
| | | 40° | 10 | 32 |
| | 1°30' | 5° | 10 | 11 |
| | | 20° | 7 | 12 |

TABLE 1-continued result of the examination for retroreflective performance of silver reflective object of the present invention.

| Subject | observation angle | light incident angle | Standard Class 2 reflection | Silver reflective object of the present invention |
|---|---|---|---|---|
| | | 30° | 5 | 11 |
| | | 40° | 4 | 11 |

As showed in table 1, the retroreflective performance of the silver reflective object of the present invention was better than standard whether the observation angle was 12', 20', 1°, or 1° 30' and light incident angle was 5°, 20°, 30° or 40°. It demonstrated that the silver reflective object of the present invention has excellent reflective effects.

Example 3

Examination for Retroreflective Performance of Multicolor Reflective Object of the Present Invention The preparation for multicolor reflective object of this example was according to the example 1, except that the ink used in this example is multicolor. The examination for retroreflective performance of said silver reflective object was conducted by SGS group (Taiwan), and the result was showed in the following table:

TABLE 2 result of the examination for retroreflective performance of multicolor reflective object of the present invention

| subject | observation angle | light incident angle | Multicolor reflective object of the present invention | |
|---|---|---|---|---|
| | | | Sample 1 | Sample 2 |
| retroreflective performance (cd/1x · m$^2$) | 12' | 5° | 519 | 500 |
| | | 20° | 495 | 504 |
| | | 30° | 432 | 458 |
| | | 40° | 362 | 384 |
| | 20' | 5° | 304 | 301 |
| | | 20° | 300 | 304 |
| | | 30° | 266 | 281 |
| | | 40° | 228 | 243 |
| | 1° | 5° | 59 | 56 |
| | | 20° | 55 | 54 |
| | | 30° | 64 | 58 |
| | | 40° | 56 | 54 |
| | 1°30' | 5° | 11 | 10 |
| | | 20° | 11 | 9.4 |
| | | 30° | 13 | 11 |
| | | 40° | 14 | 12 |

As showed in table 2, the retroreflective performance of the multicolor reflective object of the present invention was better than standard whether the observation angle was 12', 20', 1°, or 1° 30' and light incident angle was 5°, 20°, 30° or 40°. It demonstrated that the multicolor reflective object of the present invention has excellent reflective effects.

Example 4

Examination for Retroreflective Performance of Monocolor Reflective Object of the Present Invention The preparation for monocolor reflective object of this example was according to the example 1, except that the color layer thereof and the glass bead used in this example is different. That is, the color layer was composed of one color (purple, brown, pink or green), and the diameter of the glass bead used was 170~230 mesh (table 3) or 350~400 mesh (table 4). The examination for retroreflective performance of said monocolor reflective object was conducted by Automotive Researching and Testing Center (ARTC, Taiwan), and the result was showed in the following tables:

TABLE 3 result of the examination for retroreflective performance of monocolor reflective object of the present invention

| subject | observation angle | light incident angle | standard | Monocolor reflective object of the present invention (the diameter of the glass bead used is 170~230 mesh) | | | |
|---|---|---|---|---|---|---|---|
| | | | | purple | brown | pink | green |
| retroreflective performance (cd/lx·m$^2$) | 12' | 5° | 330 | 366 | 387 | 153.8 | 370 |
| | | 20° | 290 | 346 | 373 | 148.3 | 364 |
| | | 30° | 180 | 342 | 368 | 140.8 | 352 |
| | | 40° | 65 | 300 | 338 | 128.7 | 326 |
| | 20' | 5° | 250 | 220 | 237 | 141 | 225 |
| | | 20° | 200 | 211 | 236 | 136.4 | 226 |
| | | 30° | 170 | 211 | 238 | 129.9 | 225 |
| | | 40° | 60 | 193.9 | 228 | 118.8 | 217 |
| | 1° | 5° | 25 | 38.2 | 35 | 44.3 | 36.1 |
| | | 20° | 15 | 43.3 | 38.3 | 44.9 | 41 |
| | | 30° | 12 | 43.8 | 35.4 | 44.2 | 38.1 |
| | | 40° | 10 | 35.8 | 29 | 42 | 31 |
| | 1°30' | 5° | 10 | 9.4 | 9.8 | 8.8 | 9.6 |
| | | 20° | 7 | 10.7 | 11.1 | 9.5 | 11.1 |
| | | 30° | 5 | 11.7 | 11.4 | 10 | 11.8 |
| | | 40° | 4 | 11.4 | 11.4 | 9.8 | 12 |

TABLE 4 result of the examination for retroreflective performance of monocolor reflective object of the present invention

| subject | observation angle | light incident angle | standard | Monocolor reflective object of the present invention (the diameter of the glass bead used is 350~400 mesh) | | |
|---|---|---|---|---|---|---|
| | | | | purple | pink | green |
| retroreflective performance (cd/lx·m$^2$) | 12' | 5° | 330 | 356 | 311 | 349 |
| | | 20° | 290 | 329 | 294 | 321 |
| | | 30° | 180 | 313 | 291 | 316 |
| | | 40° | 65 | 281 | 267 | 298 |
| | 20' | 5° | 250 | 212 | 188.7 | 207 |
| | | 20° | 200 | 201 | 180.6 | 197 |
| | | 30° | 170 | 195 | 180.4 | 198 |
| | | 40° | 60 | 182.6 | 172.4 | 194.2 |
| | 1° | 5° | 25 | 37.8 | 33.8 | 36 |
| | | 20° | 15 | 42.2 | 37 | 40.8 |
| | | 30° | 12 | 46.7 | 38.6 | 41 |
| | | 40° | 10 | 41.1 | 32.2 | 33.1 |
| | 1°30 | 5° | 10 | 9.7 | 8.8 | 8.8 |
| | | 20° | 7 | 10.5 | 9 | 9.5 |
| | | 30° | 5 | 12.6 | 9.7 | 10.5 |
| | | 40° | 4 | 13.1 | 9.6 | 10.4 |

As showed in tables 3 and 4, the retroreflective performance of the monocolor reflective object of the present invention was better than standard whether the observation angle was 12', 20', 1°, or 1° 30' and light incident angle was 5°, 20°, 30° or 40°. It showed that the monocolor reflective object of the present invention has excellent reflective effects.

Example 5

Examination for Retroreflective Performance of Processed Monocolor Reflective Object of the Present Invention Said green and silver reflective objects were processed and examined for retroreflective performance thereof in this example. The result was showed in the following table 5, wherein the lowest retroreflective performance of processed silver reflective object was used as a standard.

TABLE 5 result of the examination for retroreflective performance of processed monocolor reflective object of the present invention

| | | | | retroreflective performance (cd/lx·m$^2$) | |
|---|---|---|---|---|---|
| Process | observation angle | incident angle | standard | Green reflective object of the present invention | Silver reflective object of the present invention |
| Abrasion | 12' | 5° | 100 | 481 | 498 |
| Flexing | | | 100 | 412 | 448 |
| Cold | | | 100 | 428 | 500 |
| T °C. variation | | | 100 | 441 | 165 |
| Rainfall | | | 100 | 230 | 300 |
| Dry cleaning | | | 100 | n/a | 531 |
| Washing | | | 100 | n/a | 165 |

As showed in table 5, the retroreflective performance of the green and silver reflective objects of the present invention were complied with the lowest standard and have good retroreflective performance whether being processed by abrasion, flexing, cold, temperature variation, rainfall, washing or dry cleaning. To sum up, in the present invention, the optical components was embedded into the adhesive layer, and the adhesive layer was used to fill up the nonflat surface of the optical components before forming a color layer thereon. Therefore, less usage of color layer was required to form a uniform and flat layer structure of a reflective object of the present invention. Consequently, the reflective layer had better light transmittance and reflective effects resulting from the thinner color layer. Also, the reflective article thereof had better reflective effects according to the aforementioned examinations for retroreflective performance of the silver, monocolor and multicolor reflective objectives of the present invention.

Other Embodiments

The preferred embodiments of the present invention have been disclosed in the examples. All modifications and alterations without departing from the spirits of the invention and appended claims, including the other embodiments shall remain within the protected scope and claims of the invention.

The preferred embodiments of the present invention have been disclosed in the examples. However, the examples should not be construed as a limitation on the actual applicable scope of the invention, and as such, all modifications and alterations without departing from the spirits of the invention and appended claims, including the other embodiments shall remain within the protected scope and claims of the invention.

What is claimed is:

1. A reflective object, comprising the following layers sequentially:

a substrate comprising a release layer and a release layer carrier;

an adhesive layer being embedded with optical components;

a color layer; and a reflective layer;

wherein the reflective object is characterized that said color layer is not contacted with said optical components, the surface of said adhesive layer is flat, said release layer is provided between said release layer carrier and said adhesive layer and said release layer is composed of polyethylene, polypropylene, polybutene, polyvinyl chloride, polyester or combinations thereof.

2. The reflective object of claim 1, further comprises an attached layer, which is formed on the surface of said reflective layer for attaching the reflective object onto a surface of an article.

3. The reflective object of claim 2, wherein said attached layer is composed of a polymer polymerized by a monomer selected from methyl carbamate, ester, ether, epoxy, urea, carbonic ester, acrylic ester, acrylic acid, olefin, vinyl chloride, amide, alcohol acid or combinations thereof.

4. The reflective object of claim 1, wherein said release layer carrier is composed of polyethyleneterephthalate (PET).

5. The reflective object of claim 1, wherein said adhesive layer is composed of a polymer polymerized by a monomer selected from methyl carbamate, ester, ether, epoxy, urea, carbonic ester, acrylic ester, acrylic acid, olefin, vinyl chloride, amide, alcohol acid or combinations thereof.

6. The reflective object of claim 1, wherein said optical components are composed of glass, ceramic or synthetic resin.

7. The reflective object of claim 1, wherein said color layer is composed of polymer, ink or silane coupling agent.

8. The reflective object of claim 1, wherein said reflective layer is composed of metal or pearl luster material.

9. The reflective object of claim 8, wherein said metal is aluminum, silver, tin or combinations thereof.

10. A reflective article, comprising the reflective object of claim 1.

11. The article of claim 10, wherein the material of said article includes cloth, plastic, wood, metal or rock.

12. A method for reflective objects production, comprising steps of:

(a) providing a substrate comprising a release layer and a release layer carrier, wherein said release layer is provided between said release layer carrier and said an adhesive layer;

(b) placing optical components onto the surface of said substrate;

(c) covering said optical components with an adhesive to obtain an adhesive layer embedded with said optical components;

(d) providing a color layer onto the surface of said adhesive layer; and (e) providing a reflective layer onto the surface of said color layer;

wherein the method is characterized that said color layer is not contacted with said optical components, the surface of said adhesive layer is flat, and said release layer is composed of polyethylene, polypropylene, polybutene, polyvinyl chloride, polyester or combinations thereof.

13. The method of claim 12, further comprises providing an attached layer onto the surface of said reflective layer.

14. The method of claim 13, wherein said attached layer is composed of a polymer polymerized by a monomer selected from methyl carbamate, ester, ether, epoxy, urea, carbonic ester, acrylic ester, acrylic acid, olefin, vinyl chloride, amide, alcohol acid or combinations thereof.

15. The method of claim 12, wherein said release layer carrier is composed of polyethyleneterephthalate (PET).

16. The method of claim 12, wherein approach for covering said optical components with said adhesive in said step (c) comprises coating, laminating, chemical deposition, imprinting or ink-jetting.

17. The method of claim 12, wherein said adhesive layer is composed of a polymer polymerized by a monomer selected from methyl carbamate, ester, ether, epoxy, urea, carbonic ester, acrylic ester, acrylic acid, olefin, vinyl chloride, amide, alcohol acid or combinations thereof.

18. The method of claim 12, wherein said optical components are composed of glass, ceramic or synthetic resin.

19. The method of claim 12, wherein said color layer is composed of polymer, ink or silane coupling agent.

20. The method of claim 12, wherein said reflective layer is composed of metal or pearl luster material.

21. The method of claim 20, wherein said metal is aluminum, silver, tin or combinations thereof.

* * * * *